Patented Oct. 10, 1950

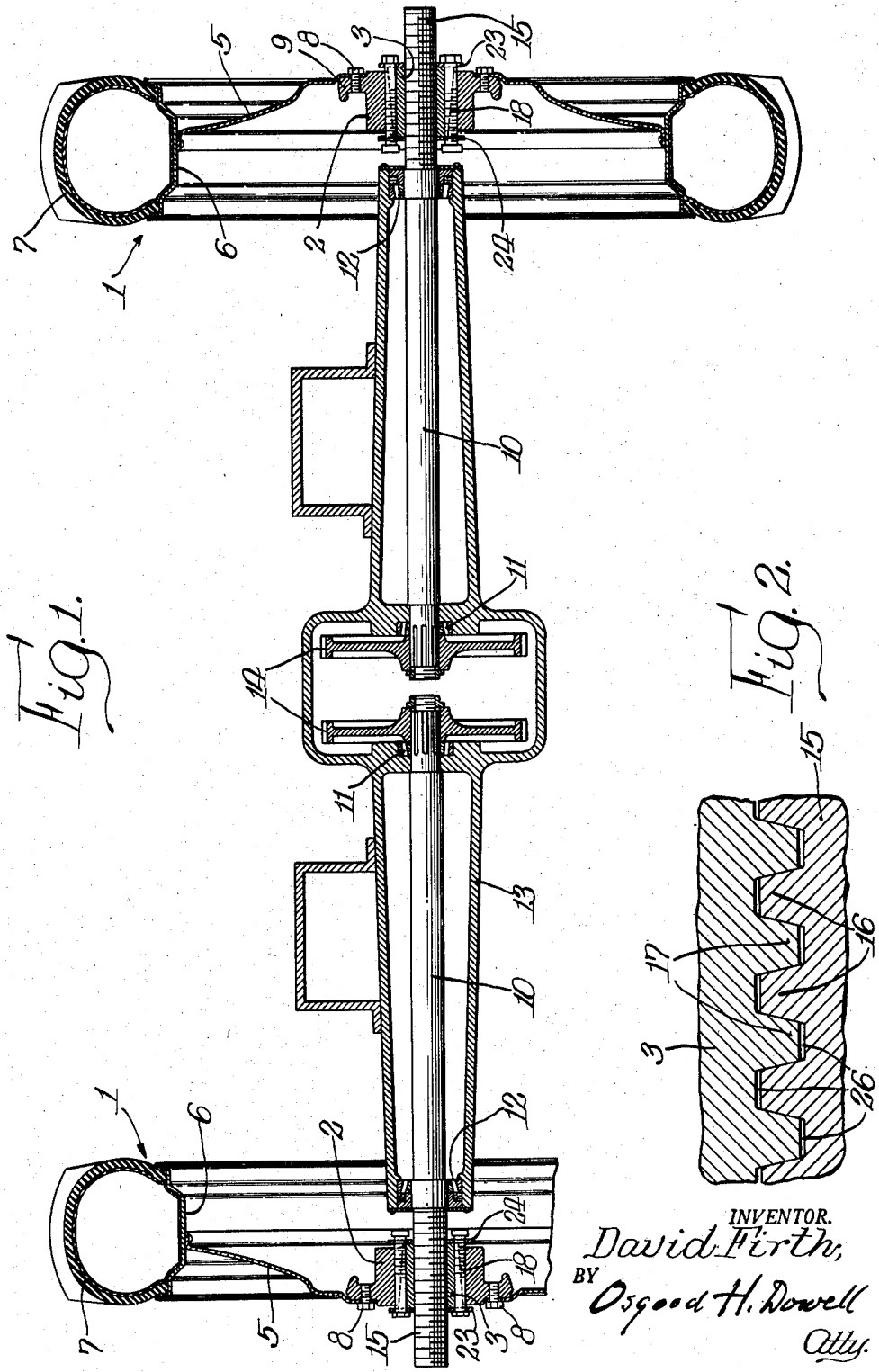

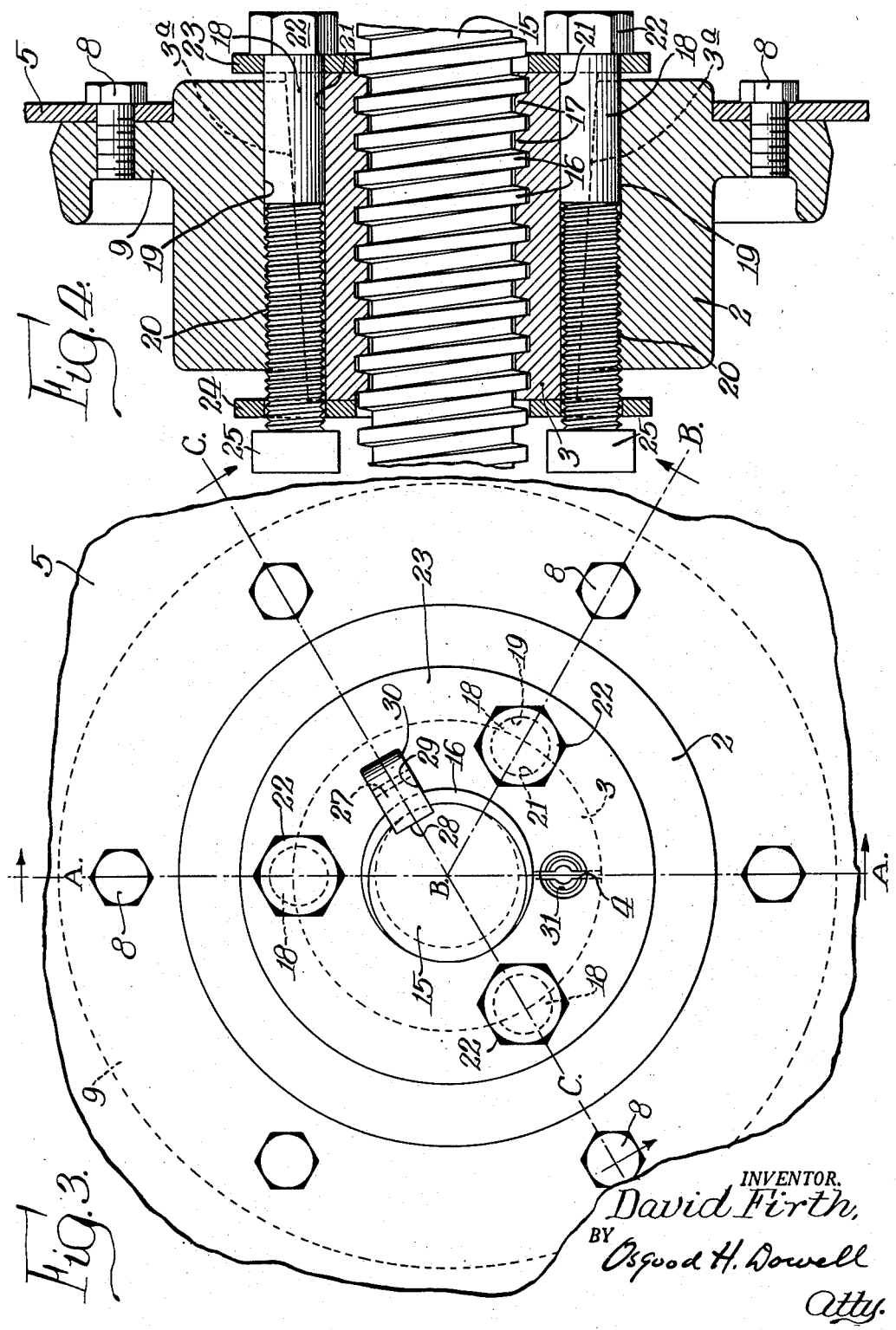

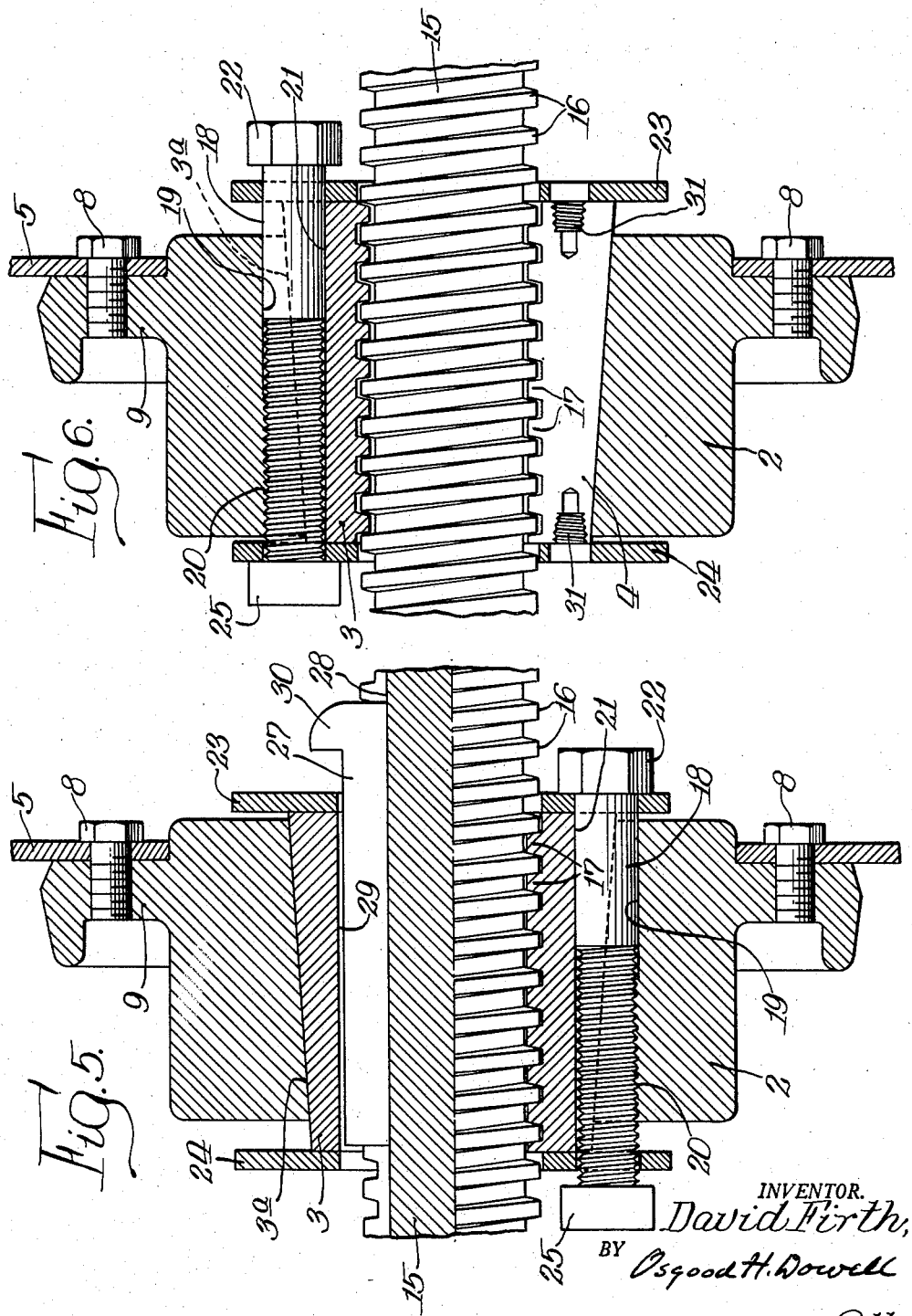

2,524,903

UNITED STATES PATENT OFFICE 2,524,903

WHEEL MOUNTING

David Firth, South Bend, Ind., assignor to Dodge Manufacturing Corporation, Mishawaka, Ind., a corporation of Indiana Application November 21, 1947, Serial No. 787,335

1 Claim. (Cl. 287—52.06)

This invention relates to wheel mountings for use under conditions requiring axial adjustability of the mounted wheels. The invention resides in a species of a broader invention described and claimed in my copending application Serial No. 787,336 for Wheel Mountings, filed concurrently herewith, now Patent No. 2,519,958.

In said copending application, I disclose a wheel mounted on a screw-threaded axle through the medium of a correspondingly internally screw-threaded tapered split contractible bushing fitting a tapered bore in the wheel hub and screwable on said axle when the bushing is in uncontracted state. The mounting structure includes screw equipment for forcing the hub on the bushing to contract it tight on the axle and for forcing the hub off the bushing to release it, these operations being referred to as the wedging and dewedging of the bushing. The screw equipment shown for this purpose in such copending application is of the type disclosed in patent to Firth, No. 2,402,743, of June 25, 1946.

A wheel mounting embodying the present invention is characterized by screw equipment comprising a set of screws in threaded engagement with only the wheel hub, and thrust-transmitting plates connected by said screws and abutting the opposite ends of the bushing, the construction being such that the bushing can be wedged by rotating the screws in one direction and dewedged by rotating the screws in the opposite direction.

The invention finds a field of useful application in farm tractors, the driving or traction wheels of which need to be axially adjusted from time to time to suit the spacing of rows of plants between which the wheels are to be run. Adjustment of such wheels often involves very severe labor, but is rendered relatively easy by the use of wheel mountings of the type to which the invention relates.

An illustrative embodiment of the invention in one practicable form, is shown in the accompanying drawings, wherein:

Fig. 1 is a longitudinal vertical section of a tractor driving wheel and shaft assembly having wheel mountings embodying the invention, the section being taken through the housing for the driving axle shafts and said shafts being shown in elevation.

Fig. 2 is a detail view of interengaging axle and bushing threads of a type best adapted for the purpose of the invention.

Fig. 3 is an end elevation of the central portion of one of the driving or traction wheels.

Fig. 4 is a section taken half on the line A—A and half on the line B—B of Fig. 3, looking in the directions of the arrows.

Fig. 5 is a section taken on the line C—C of Fig. 3, looking in the direction of the arrows.

Fig. 6 is a section taken on the line A—A of Fig. 3, showing the bushing dewedged.

In the drawings, the driving or traction wheels of a farm tractor are designated by the numeral 1. These wheels have taper-bored hubs 2 in which are fitted resilient tapered bushings 3 split longitudinally as indicated at 4 to permit contraction thereof. The wheels shown comprise annular discs 5 equipped with rims 6 carrying the wheel tires 7, said discs 5 being affixed by screws 8 to radial flanges 9 on the wheel hubs 2.

The driving axle shafts for said wheels are designated by the numeral 10. These shafts are mounted each in bearings 11 and 12 in the driving axle shaft housing 13, which is supported by said shafts from the wheels. The bearings 11 and 12 for each shaft are arranged to sustain opposite end thrusts, whereby the shafts are held from axial displacement. Fixed on these alined shafts are gears 14 by which the shafts are separately driven from the tractor motor through suitable differential gearing (not shown), to permit the wheels to be driven at different angular speeds as the tractor makes a turn or travels otherwise than in a straight line, thus avoiding undue wear on the tires.

The shafts 10 are formed with extended screw axles 15 on which the wheel hubs are mounted through the medium of their tapered split contractible bushings 3, the latter having tapped bores forming internal screw threads matching and interengaged with those of said screw axles. The interengaging threads of said axles and bushings are designated respectively by the numerals 16 and 17. An appropriate working clearance exists between these threads when the bushings are in uncontracted state. In Fig. 4, the tapered exterior surface of the bushing therein shown is indicated by the oblique dotted lines 3ª.

Each wheel hub has associated screw equipment whereby, when the wheel is raised from the ground by jacking up the adjacent end of the driving axle shaft housing, the wheel can be forcibly moved relative to the bushing to compress it by the hub tight on its screw axle, thereby wedging the bushing, and can be reversely moved to dewedge or release the bushing so as to permit it to resume its uncontracted state. The screw equipment provided in the illustrative construction comprises a single set of screws 18 operable in one direction for wedging and reversely operable for dewedging.

As shown in Figs. 3 to 6, the holes for the screws 18 are formed partly by hub grooves 19 having tapped walls forming female screw threads 20 engaged by the threads of said screws, said female threads being mutilated or cut by the tapered hub bore, and partly by smooth-walled bushing grooves 21 confronting said hub grooves and of appropriate curvature for cooperation therewith to provide screw-holes in which said screws can be operatively fitted. Thus the screws are in threaded engagement only with the hub. The bushing 3 projects at both ends beyond the ends of the hub 2. The screws 18 consist of cap screws the heads 22 of which bear indirectly against the large end of the bushing through an interposed thrust-transmitting annular plate 23 abutting the bushing, there being clearance between said plate and adjacent end of the hub when the bushing is wedged, as shown in Fig. 4. It will be understood that the shanks of the screws 18 pass loosely through holes in said plate in registration with the screw-holes aforesaid. Abutting the small end of the bushing is a similar annular plate 24. The screws 18 extend loosely through holes in said plate 24 and have affixed thereon nuts 25 which are screwed on said screws and pinned or riveted thereto, said nuts 25 being spaced from said plate 24 when the bushing is wedged. To wedge the bushing, the screws 18 are screwed up to bring the screw heads 22 against the plate 23 and are then tightened to draw the wheel hub forwardly on the bushing. To dewedge, the screws are operated reversely or in the unscrewing direction to bring the nuts 25 against the plate 24 and are then tightened by further operation in the unscrewing direction to draw the bushing backward sufficiently to release the bushing, there being clearance between the plate 24 and hub 2 when the bushing is dewedged, as appears from Fig. 6.

Utilization for the wedging and dewedging functions of screw equipment of the type disclosed affords the further advantage that the screws serve as keying means, whereby the bushing when loose in the hub can be screwed on the wheel axle by rotating the wheel.

Referring further to Figs. 3 to 6, the tightness with which the bushing 3 can be wedged depends upon its taper. It is desirable for effective wedging that the angle of taper of the bushing i. e. the included angle between diametrically opposite longitudinal contour lines thereof, be not greater than and preferably substantially less than thirteen degrees. On the other hand, an extremely slight taper of the bushing might result in such tight wedging thereof as to render dewedging unduly difficult. An angle of taper of from about six to about nine degrees is preferred. This will allow such tight wedging of the bushing as to obtain a press tight fit thereof in the hub, without making it unduly difficult to dewedge the bushing.

An appropriately tapered bushing tightly wedged grips the hub with such a powerful hold as to afford a driving connection for transmission of high torque. Keying of the hub to the bushing is believed to be unnecessary, except to enable the bushing when loose in the hub to be screwed on the screw axle 15 by rotating the wheel. In any event, the screws 18 or at least one of them afford a sufficient driving key connection between the hub and bushing, if it be needed.

Reference will now be made to the threading of the screw axles 15 and corresponding internal threading of the hub bushings 3. Easy axial adjustment of the driving wheel is not dependent upon the form of the interengaging screw threads of said axles and bushings, since, regardless of the type of screw threads utilized, the bushings may be keyed to the screw axles as hereinafter explained. It is desirable however to minimize or obviate keying requirements, or to minimize torque reactions on such keying connections between the bushings and axles as may be employed. It is accordingly desirable to form said axles and bushings with screw threads of appropriate form and proportions for interwedging of their convolutions, so that the bushings when tightly wedged will grip the screw axles with such powerful holding effect as to afford driving connections capable of transmitting high torque.

In the illustrative structure, the screw axle and hub bushing for each wheel are formed, as shown in Figs. 3 to 6, with large interengaging screw threads 16 and 17 of the type known in the screw industry as Acme threads. These are broad topped threads having sloping sides of steep slant, and are desirable for their sturdiness as well as for the much steeper slant of their sides than those of ordinary V-type threads. As shown in Fig. 2, said screw threads 16 and 17 are proportioned for interwedging. The two threads are of the same cross-sectional form and dimensions, and of the same radial dimensions as the spiral grooves which are cut to form the threads; but their transverse dimensions, in a plane in which the hub axis lies, are slightly greater than the corresponding dimensions of said grooves. Hence when the bushing 3 is contracted tight on the screw axle, the convolutions of each thread are tightly wedged between the convolutions of the other, leaving clearance between the tops of the threads and bottoms of said grooves as indicated at 26 in Fig. 2.

Screw threads of the Acme type can be interwedged much more tightly than ordinary threads of V-shaped cross-section. In the case of a standard V-thread, the included angle between adjacent convolutions thereof is sixty degrees, whereas in the case of a standard Acme thread the included angle between adjacent convolutions thereof is only twenty-nine degrees. Further advantage with respect to tight interwedging may be gained by utilizing Acme threads having sides of still steeper slant. A slant such that the included angle aforesaid is only twenty degrees is considered preferable. Fig. 2 may be considered as representing tightly interwedged Acme threads having sides of such preferred slant.

It will be understood that by the tight interwedging of the screw threads of the screw axles and bushings, driving connections are established independently of or supplementing such connections as may be provided by keying the bushings to the axles; that the connections so obtained would be of fairly high torque-transmitting capacity if the threads were V-threads having their tops truncated to permit interwedging; that the connections obtainable by the tight interwedging of standard Acme threads are of very high torque-transmitting capacity, and that connections of still higher torque-transmitting capacity are obtainable by use of Acme threads having sides of the preferred slant described with reference to Fig. 2. With the use of Acme threads, and especially those having sides of such preferred slant, it is thought keying of the bushings to the screw axles may be unnecessary.

If however it be necessary or deemed advisable, the driving connections established between the screw axles and bushings by the interwedging of their screw threads may be supplemented by keying. For example, the hub bushing of each wheel may be keyed to the screw axle, as shown in Figs. 3 and 5, by a removable key 27 fitting slidably in a keyway or groove 28 in and extending the full length of the screw axle and in a mating keyway or groove 29 in the bushing, in which case, before wedging the bushing, the wheel need be given only a half turn or less to register said grooves. The key may be inserted before wedging the bushing if the proportions of the key relative to the depth of the grooves is such as to provide clearance between the key and the bottoms or grounds of the grooves when the bushing is wedged, so as to avoid any interference with contraction and tight wedging of the bushing. A straight key as shown is preferred, though in lieu thereof a tapered key could be employed, to be driven after wedging of the bushing between the seat therefor provided by the groove 28 in the axle and a seat provided by a bushing groove of gradually diminishing depth. The key, whether straight or tapered should be removable. The key shown has a head 30 which when the key is in place is spaced sufficiently from the plate 23 to permit driving a wedge between said plate and head for forcing out the key in case it should become stuck.

Upon dewedging the bushing 3 of either wheel hub, the bushing will expand to uncontracted state if its spring force is sufficient to withdraw its thread convolutions from frictional engagement with those of the screw axle. Should the bushing when dewedged fail to release itself from gripping engagement with the screw axle, due to tight interwedging of said threads, or in case the bushing after long service in wedged condition should have become set in contracted state, its release from the shaft can be effected by forcing an appropriate spreading tool into the bushing split. To facilitate spreading or expanding it under such conditions, each bushing 3, as shown in Figs. 3 and 6, is provided at the opposite ends of its longitudinal slot 4 with longitudinal grooves or recesses 31 in the confronting walls of said slot, in the form of segments of conical screwholes. When the bushing is contracted, the opposing recesses 31 form approximately conical screw holes intersected longitudinally by the slot 4, as shown in Fig. 3, in which holes a suitable tool, e. g., a piece of iron pipe having a threaded end, can be worked to spread or expand the bushing.

To change the distance between the driving wheels of the illustrative structure, each wheel in turn is jacked up and released from driving connection with its axle by withdrawing the key 27, dewedging the bushing 3 and expanding it by aid of a spreading tool if necessary. The released wheel is then adjusted in or out as desired by rotating the wheel in the proper direction for adjustment, requiring only comparatively slight effort. The adjusted wheel is then given such slight turn as may be required for registering the keyways 28 and 29, whereupon the wheel is again secured in driving connection with the axle by reinserting the key and wedging the bushing by operation of the screws 18.

It is within contemplation to form the screw axles 15 and hub bushings 3 with interengaging double or triple threads or other pluralities of screw threads of relatively large pitch, each thread of each bushing fitting and wedgeable between two threads of the corresponding screw axle. The effect would be to increase the resistance to turning of the wheels on the screw axles when the bushings are uncontracted, and hence to increase the torque-transmitting capacity of the friction-grip connections between the axles and bushings. In the appended claim, interengaging threads will be understood to include such interengaging pluralities of threads.

I claim:

A wheel mounting comprising a taper-bored hub, a screw-threaded axle, a tapered split contractible bushing fitting the bore of said hub and having an internal screw thread matching and interengaged with the thread of said axle, the bushing when uncontracted being screwable on and off from said axle by rotating the hub, said hub and bushing having confronting grooves forming screw holes having threaded walls only in the hub, screws in said holes the threads of which engage the threads of said threaded walls, said bushing being slightly longer than and protruding from the ends of the hub, thrust-transmitting plates abutting the ends of the bushing and having holes through which said screws extend loosely, said screws having heads to bear against the plate abutting the corresponding end of said bushing, the threaded shanks of said screws extending through the other plate and having nuts fixed thereon, whereby the screws can be operated in opposite directions for forcing the hub on the bushing to contract it and off from the bushing to release it.

DAVID FIRTH.

REFERENCES CITED

The following references are of record in the file of this patent:

UNITED STATES PATENTS

| Number | Name | Date |
| --- | --- | --- |
| 2,324,681 | Dekker | July 20, 1943 |
| 2,402,743 | Firth | June 25, 1946 |